(12) United States Patent
Murthy et al.

(10) Patent No.: US 9,948,632 B2
(45) Date of Patent: Apr. 17, 2018

(54) SHARING DATA BETWEEN SANDBOXED APPLICATIONS WITH CERTIFICATES

(71) Applicant: AirWatch LLC, Atlanta, GA (US)

(72) Inventors: Varun Murthy, Atlanta, GA (US); Kalyan Regula, Alphretta, GA (US); Shravan Shantharam, Cumming, GA (US); Jason Roszak, Brookhaven, GA (US)

(73) Assignee: AIRWATCH LLC, Atlanta, GA (US)

( * ) Notice: Subject to any disclaimer, the term of this patent is extended or adjusted under 35 U.S.C. 154(b) by 129 days.

(21) Appl. No.: 14/923,840

(22) Filed: Oct. 27, 2015

(65) Prior Publication Data
US 2017/0118197 A1    Apr. 27, 2017

(51) Int. Cl.
*G06F 21/53* (2013.01)
*H04L 29/06* (2006.01)
*G06F 21/44* (2013.01)

(52) U.S. Cl.
CPC .......... *H04L 63/0823* (2013.01); *G06F 21/53* (2013.01); *H04L 63/0428* (2013.01); *G06F 21/44* (2013.01)

(58) Field of Classification Search
None
See application file for complete search history.

(56) References Cited

U.S. PATENT DOCUMENTS

| | | | | |
|---|---|---|---|---|
| 5,995,625 A * | 11/1999 | Sudia | .................. | G06F 21/6209 705/51 |
| 2004/0193884 A1* | 9/2004 | Molaro | .................... | G06F 21/52 713/175 |
| 2006/0143700 A1* | 6/2006 | Herrmann | ........... | H04L 63/0823 726/14 |
| 2008/0201575 A1* | 8/2008 | van der Rijn | ........... | H04L 9/321 713/156 |
| 2008/0222413 A1* | 9/2008 | Vilhuber | ............. | H04L 63/0442 713/156 |
| 2014/0068251 A1* | 3/2014 | Ignaci | ..................... | H04L 9/006 713/158 |
| 2014/0258711 A1* | 9/2014 | Brannon | ............. | H04L 63/0823 713/156 |
| 2014/0337628 A1* | 11/2014 | Amato | .................. | H04L 9/0825 713/171 |
| 2016/0308843 A1* | 10/2016 | Cassel | .................... | G06Q 20/40 |

FOREIGN PATENT DOCUMENTS

WO   WO 2015088402 A1 *   6/2015   ............. G06Q 20/40

* cited by examiner

*Primary Examiner* — Malcolm Cribbs
(74) *Attorney, Agent, or Firm* — Thomas Horstemeyer, LLP

(57) ABSTRACT

Disclosed are various approaches for sharing data between sandboxed applications with certificates. A request for a certificate is received from a client device. The certificate is then generated, wherein the certificate comprises data to be shared between applications executing on the client device. A response is sent to the client device, wherein the response includes the certificate.

20 Claims, 4 Drawing Sheets

SHARING DATA BETWEEN SANDBOXED APPLICATIONS WITH CERTIFICATES

BACKGROUND

Modern operating systems allow for individual applications to execute in a sandbox. A sandbox is a security mechanism for separating running applications. A sandbox typically provides a tightly controlled set of resources for the application executing in the sandbox, such as portions of disk space and memory that are inaccessible to applications executing outside of the sandbox. Other resources, such as network access, the ability to make system calls, the ability to inspect the host system, read from input devices, or write to the filesystem, are often disallowed or heavily restricted. Accordingly, a malicious application executing in a sandbox is often unable to compromise the host system or interfere with the execution of other applications by the host system.

As a result, a sandboxed application is often unable to communicate or directly share information with another application executing outside of the sandbox. For example, a sandboxed application can be prevented from sending a message or request to another sandboxed application using traditional approaches for interprocess communications (e.g. signals, sockets, pipes or named pipes, message queues, shared memory, memory-mapped files, files on disk, or similar approaches). Moreover, an application executing in the sandbox can be unaware of the existence of applications outside of the sandbox. As a result, multiple applications installed on a client device that communicate with a common server backend can be viewed as separate client devices or duplicate client devices by the server backend.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for sharing data between sandboxed applications using certificates. An application executing in a sandbox on a client device can request a certificate from a certificate service in order to use the certificate to communicate with another application executing on the client device in its own sandbox. In some instances, the application can then include extra data in the certificate provided by the certificate service, such as a message intended for the other application. In other instances, the application can include the extra data in the request for the certificate, which the certificate service can include in the certificate when the certificate is generated. In either instance, the application can then save the certificate to a certificate store accessible by both applications. To ensure that additional applications are unable to access the extra data included in the certificate, the data can be encrypted using a previously shared symmetric encryption key known only to the two applications or a public key corresponding to a private key that is only available to the two applications.

Figure 1:
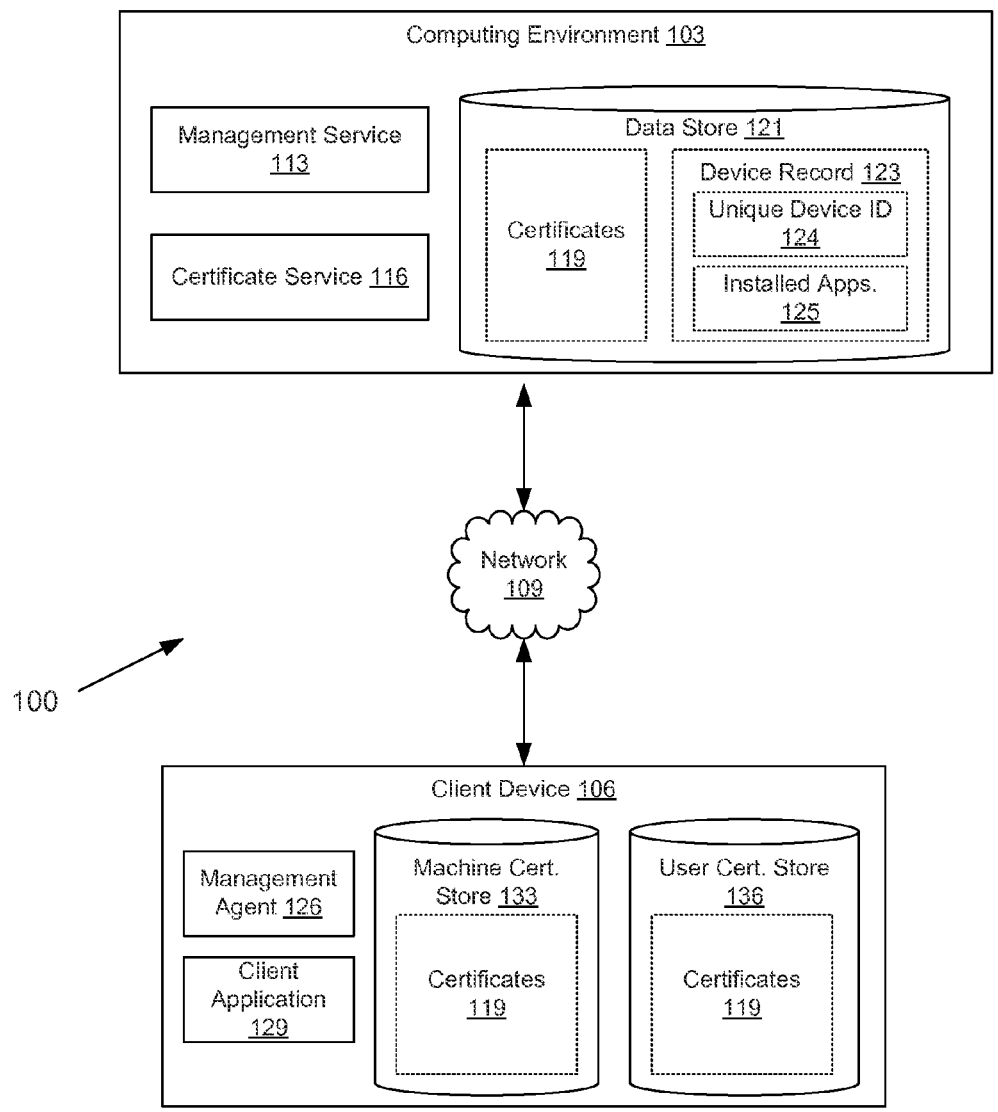
FIG. 1 is a schematic block diagram of a network environment.

With reference to FIG. 1, shown is a networked environment 100 according to various examples. The networked environment 100 includes a computing environment 103, a client device 106, and potentially other devices, which are in data communication with each other across a network 109. The network 109 includes, for example, the Internet, intranets, extranets, wide area networks (WANs), local area networks (LANs), wired networks, wireless networks, or other suitable networks, or any combination of two or more networks. For example, a network 109 can correspond to a satellite network, cable network, Ethernet network, Wi-Fi network, cellular network, or other types of networks.

The computing environment 103 can include a server computer or any other system providing computing capability. Alternatively, the computing environment 103 can employ a plurality of computing devices that can be arranged, for example, in one or more server banks or computer banks or other arrangements. The computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

The components executed on the computing environment 103, for example, include a management service 113, a certificate service 116, and other applications, services, processes, systems, engines, or functionality. The management service 113 can administer the operation of various client devices 106 registered or otherwise enrolled with the management service 113. To this end, the management service 113 can enforce or otherwise require particular applications to be installed on an enrolled client device 106. For example, the management service 113 can require that particular web browsers, email applications, virtual private networking (VPN) clients, or other software be installed. Similarly, the management service 113 can require the client device 106 to be configured in a particular manner. For example, the management service 113 can require the client device 106 to use the VPN client when the client device 106 is connected to an external network or a Wi-Fi network, require the use of encryption when sending or receiving email, or otherwise require various settings to be set to specified values. In some instances, the management service 113 can also require that particular features be enabled or disabled on the client device 106. For example, the management service 113 can require that disk encryption be enabled for the client device 106. In other instances, the management service 113 can require that the client device 106 perform particular actions in response to receiving a command from the management service 113 For example, the management service 113 can instruct the client device 106 to delete data or applications from its memory in response to a notification from the management service 113 that the enrollment status of the client device 106 has changed, as further described below.

The certificate service 116 can enroll client devices 106 to receive certificates 119, issue certificates 119 in response to requests from client devices 106 for certificates 119, generate certificates 119 on behalf of client devices 106, sign certificates 119 to verify the authenticity of the certificates 119, and similar functionality. The certificate service 116 can communicate with client devices 106 using a version of the simple certificate enrollment protocol (SCEP) or similar protocols. In such instances, the certificate service 116 can correspond to a certificate authority (CA), a SCEP registration authority (RA), or a combination of the two. The certificate service 116 can also be part of an enterprise computing environment 103 or a separately hosted cloud based service.

The data store 121 can represent a plurality of data stores 121. The data stored in the data store 121 can be associated with the operation of the various applications or functional entities described below. The data stored in the data store 121 can include one or more certificates 119, one or more device records 123, and potentially other data.

A certificate 119 can represent an electronic document used to prove ownership of a public encryption key. A certificate 119 can include information about the encryption key, information about the identity of the owner of the encryption key, and a cryptographic signature of an entity that has verified that the contents of the certificate 119 are correct. For example, a certificate formatted according to the X.509 standard can include the following fields in the certificate: version number, serial number, signature algorithm identifier, issuer name, validity period, subject name, subject public key information (including a public key algorithm and subject public key), a unique identifier of the issuer of the certificate 119, unique identifier of the subject of the certificate 119, a certificate signature algorithm, and a certificate signature. Extensions to the X.509 standard allow for additional data fields to be included in a certificate. Examples of extensions include fields identifying specific cryptographic operations which can be performed with the certificate of the purpose of the public key contained in the certificate.

A device record 123 can represent information related to a client device 106. Accordingly, each client device 106 can have at least one associated device record 123 stored in the data store 121. A device record 123 can include a unique device identifier 124 assigned to the client device 106, a list of installed applications 125, and potentially other data regarding the client device 106. The unique device identifier 124 can correspond to a serial number, a media access control (MAC) address for a network interface of the client device 106, a unique identification number generated by the management service 113, a device fingerprint, or similar unique identifier. In some instances, the unique device identifier 124 is generated and assigned in response to the first time an application executing on the client device 106 attempts to enroll, register, or otherwise connect or communicate with the management service 113. The list of installed applications 125 can include a list of applications that are currently installed on the client device 106.

The client device 106 can represent one or more client devices 106 that can be coupled to the network 109. The client device 106 can correspond to a desktop computer, a laptop computer, personal digital assistants, cellular telephones, smartphones, set-top boxes, music players, web pads, tablet computer systems, game consoles, electronic book readers, or other devices with like capability. The client device 106 can also include a display, such as a liquid crystal display (LCD), gas plasma-based flat panel displays, organic light emitting diode (OLED) displays, electrophoretic ink (E ink) displays, LCD projectors, or other types of display devices The client device 106 can execute various applications such as the management agent 126, the client application 129, or other applications. The management agent 126 can perform actions specified by the management service 113, as further described below. The client application 129 can be executed in the client device 106 to perform various functions. For example, the client application 129 can include a web browser, an email application, a word processor, a spreadsheet application, a document viewer, a camera application, a media player, a content access application, various social networking applications, a messaging or chat application, a banking application, a calendar application, and potentially other applications. In some instances, one or more client applications 129 can be developed by the same entity, such as individual client applications 129 in a software suite, or developed using a common set of libraries provided by a third party, such as a software development kit (SDK) or framework. In some instances, the management agent 126 and one or more client applications 129 can be part of a suite of applications released by a common developer or developed using a common SDK.

In these instances, where client applications 129 are commonly developed or developed using a common SDK, the client applications 129 can be cryptographically signed with the same signing key to indicate the relationship. For example, client applications 129 developed by the same developer can be signed with the same signing key to prove common development. Likewise, client applications 129 developed using a common SDK can be signed with a signing key associated with SDK. In these instances, signing the client applications 129 can indicate that the client applications 129 share a common set of functions or application programming interface (API) calls.

Moreover, the client device 106 can include one or more certificate stores provided by the operating system of the client device, such as a machine certificate store 133 and a user certificate store 136. Each certificate store can include one or more certificates 119 that have been downloaded to or otherwise installed on the client device 106. Further, each certificate store can have different access controls or permissions. For example, a certificate 119 stored in the machine certificate store 133 is available to any application executing on the client device 106. In contrast, the user certificate store 136 is associated with a specific user account. Therefore, in one example, a certificate 119 stored in the user certificate store 136 is only available to applications launched with the user account associated with the user certificate store 136. For client devices 106 that allow for multiple users or user accounts, each user account can be associated with its own user certificate store 136.

Next, a general description of the operation of the various components of the networked environment 100 is provided. To begin, the management agent 126 is installed on the client device 106. As part of the installation process, the management agent 126 can enroll with the management service 113 to make the management service 113 aware of the existence of the management agent 126 and the client device 106. In addition, enrollment can serve to authorize the management service 113 to provide instructions to the management agent 126 to perform specified actions. For example, during the enrollment process, the management service 113 can instruct the management agent 126 to request a certificate 119 from the certificate service 116. In some instances, the management service 113 can also instruct the management agent

126 to store the requested certificate 119 in a particular certificate store, such as the machine certificate store 133 or the user certificate store 136.

The certificate service 116, upon receiving a request from the management agent 126, can then generate a certificate 119 for the management agent 126 to install on the client device 106. In some instances, the certificate service 116 can include extra data in the certificate 119, such as a unique device identifier 124 to be used for the client device 106 and a unique identifier for the management service 113. The unique identifier for the management service 113 can correspond to cryptographic signature key, a unique application fingerprint, or a similar unique identifier.

The management agent 126 then receives the certificate 119 from the certificate service 116 and stores the certificate in either the machine certificate store 133 or the user certificate store 136, depending on the instructions received from the management service 113. If no instructions were received from the management service 113, the management agent 126 can save the certificate 119 to a default certificate store. Whether the management agent 126 saves the certificate 119 to the machine certificate store 133 or the user certificate store 136 can be configured during installation of the management agent 126 or through a run-time setting in other instances.

Subsequently, the client application 129 is installed on the client device 106. In some instances, the client application 129 can attempt to register or otherwise enroll with the management service 113 as part of the installation process in order to make the management service 113 aware of the client application 129. Registration or enrollment can also serve to authorize the management service 113 to provide instructions to the client application 129 to perform specified actions. In other instances, however, the client application 129 can attempt to register with the management service 113 after installation on the client device 106 is completed.

As part of the registration process, the management service 113 can send a query to the client application 129 to determine if another application executing on the client device 106, such as the management agent 126, has registered with the management service 113. The query can include an identifier of the previously installed certificate 119 and indicate whether the previously installed certificate 119 was stored in the machine certificate store 133 or the user certificate store 136.

The client application 129 can provide several different responses to the query, each of which can indicate that the client device 106 has been previously registered with the management service 113. For example, the client application 129 can provide a copy of the certificate 119 stored on the client device 106. By producing the certificate 119 itself, the client application 129 can show that the client device 106 had been previously registered with the management service 113. As another example, the client application 129 can read or otherwise parse the certificate 119 for the unique identifier of the client device 106 embedded in the certificate 119. By providing the unique identifier of the client device 106, the client application 129 can show that the client device 106 had been previously registered with the management service 113.

After receiving the response from the client application 129, the management service 113 can associate the client application 129 on the client device 106 with a previously existing device record for the client device 106 instead of creating a new, duplicate record for the client device 106.

In some instances, the management service 113 can subsequently push a new certificate 119 to the client device 106. For example, the management service 113 can push a new certificate 119 in order to provide a certificate 119 containing an updated list of applications installed on the client device 106, such as the management agent 126, the client application 129, and other applications in communication with the management service 113. For example, the management service 113 can send a command to the management agent 126 to request a new certificate 119 from the certificate service 116. The certificate service 116 can then generate a new certificate 119 that contains the new or updated information. Any sandboxed application on the client device 106 can then access the new certificate 119 to determine what other applications are currently installed on the client device 106.

In other instances, an installed application executing in a sandbox, such as a first client application 129, can request a new certificate 119 from the certificate service 116 in order to send information to another application executing in another sandbox, such as a second client application 129. For example, the first client application 129 can send a certificate request to the certificate service 116. The request can include a message intended for the second client application 129. The certificate service 116 can then generate the new certificate 119 that includes the message, and provide the new certificate 119 to the first client application 129 in response. Depending on the access permissions provided to the first client application 129, the first client application 129 can then save the new certificate 119 to either the machine certificate store 133 or the user certificate store 136. The second client application 129 can then access the new certificate 119 to retrieve the message.

In these instances, the message can be embedded in any one or more fields or components of the certificate 119. In some examples, the message can be embedded in an optional extension to the certificate 119. In other examples, the message can be embedded in an unused field of the certificate 119. In other examples, the message can replace the value of one of the standard fields in the certificate 119. For example, a certificate 119 complying with the X.509 standard normally has a field that includes a public key. This public key field can be repurposed to store a message between two client applications 129 instead of storing a public key.

Many different types of data can be embedded in the message or represented by the message. For example, the message can include a list of applications currently installed on the client device 106. As another example, the message could include interprocess communications (IPC), such as event notifications sent from one application to another, application programming interface (API) calls between applications, data being transferred from one application to another (such data copied and pasted from one application to another), and similar types of data.

Figure 2:
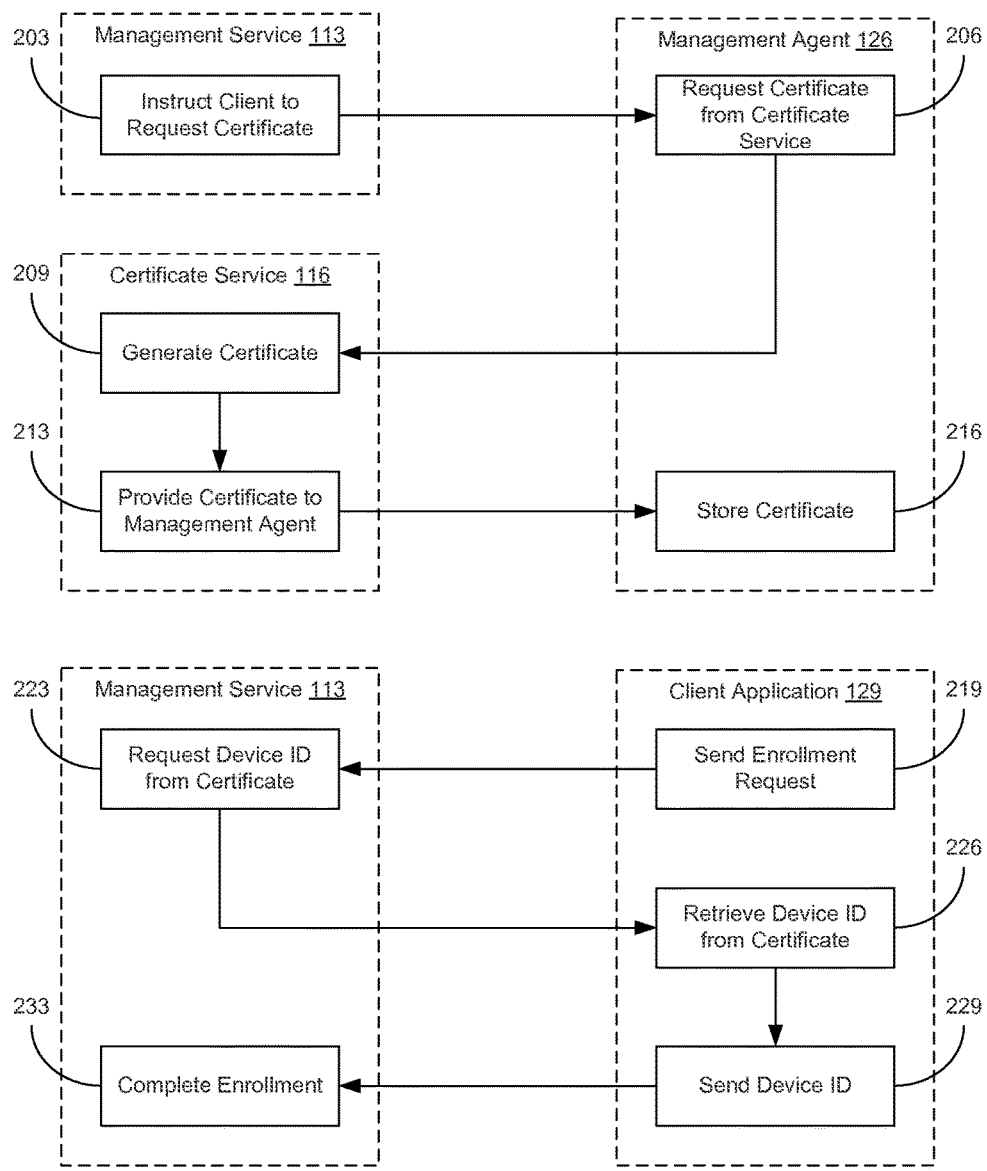
FIG. 2 is a sequence diagram depicting the interaction of various components.

Referring next to FIG. 2, shown is a sequence diagram that provides one example of the operation of portions of the management service 113, the certificate service 116, the management agent 126, and a client application 129. As an alternative, the sequence diagram of FIG. 2 can be viewed as depicting an example of elements of a method implemented in the networked environment of FIG. 1.

Beginning with step 203, the management service 113 can send a command to or otherwise instruct the management agent 126 to request a certificate 119 from the certificate service 116. The command can, for example, specify a particular version of SCEP that is to be used and identify the certificate service 116 to be used. For example, the command can specify a URL or an internet protocol (IP) address for the certificate service 116.

Moving on to step 206, the management agent 126 can request a certificate 119 from the certificate service 116. In some examples, the request can be formatted to conform with a version of SCEP. However, other protocols can also be used for the request.

Proceeding to step 209, the certificate service 116 can generate a certificate 119 for the client device 106. At this point, additional information or data can be included in the certificate 119, such as a unique device identifier 124 assigned to the client device 106 by the management service 113 or other data. The certificate service 116 can include this data in one or more fields of the certificate 119. For example, the certificate service 116 can include a unique device identifier 124 in an extension field of the certificate 119. In some instances, this data can be stored in the certificate 119 in encrypted form in order to prevent unauthorized applications from reading the data by accessing the certificate 119.

Moving on to step 213, the certificate service 116 can provide the generated certificate 119 to the management agent 126. In some examples, the response can also comply with a version of the SCEP. However, other protocols can also be used for the response.

Referring next to step 216, the management agent 126 stores the certificate 119 provided by the certificate service 116 in a certificate store on the client device 106. The management agent 126 can store the certificate 119 in the machine certificate store 133 if the certificate 119 is intended be globally accessible, such as when multiple applications executed by different users require access to the certificate 119. The management agent 126 can also store the certificate 119 in the user certificate store 136 if access to the certificate 119 is intended to be restricted to applications executed by a specific or single user. In some instances, the management agent 126 can be preconfigured to store the certificate 119 in a particular certificate store. In other instances, the management service 113 can provide the management agent 126 with an instruction to store the certificate in a specific certificate store.

Sometime later, after the certificate 119 has been stored by the management agent 126, a client application 129 installed on the client device 106 can attempt to enroll or register with the management service 113. Accordingly, at step 219, the client application 129 can send an enrollment request to the management service 113. The enrollment request can include the identity of the client application 129, authentication credentials to allow the client application 129 to register or enroll with the management service 113, and potentially other data.

Proceeding to step 223, the management service 113 sends a request to the client application 129 to provide the unique device identifier 124 of the client device 106 stored in the certificate 119. In some instances, the management service 113 can include a serial number or similar unique identifier of the certificate 119 and an identification of the certificate store in which the certificate 119 was stored.

Moving on to step 226, the client application 129 retrieves the unique device identifier 124 assigned to the client device 106 from the certificate 119. For example, the client application 129 can parse the certificate 119 to extract the unique device identifier 124. In some instances, the unique device identifier 124 can be stored or embedded in the certificate 119 in an encrypted format. In such instances, the client application 129 can parse the certificate 119 to extract the encrypted version of the unique device identifier 124 from the certificate 119 and then decrypt the unique device identifier 124.

Referring next to step 229, the client application 129 sends the unique device identifier 124 to the management service 113.

Proceeding to step 233, the management service 113 completes the enrollment process for the client application 129. For example, the management service 113 can add the client application 129 to a list of installed applications 125. After step 233, the illustrated process ends.

Figure 3:
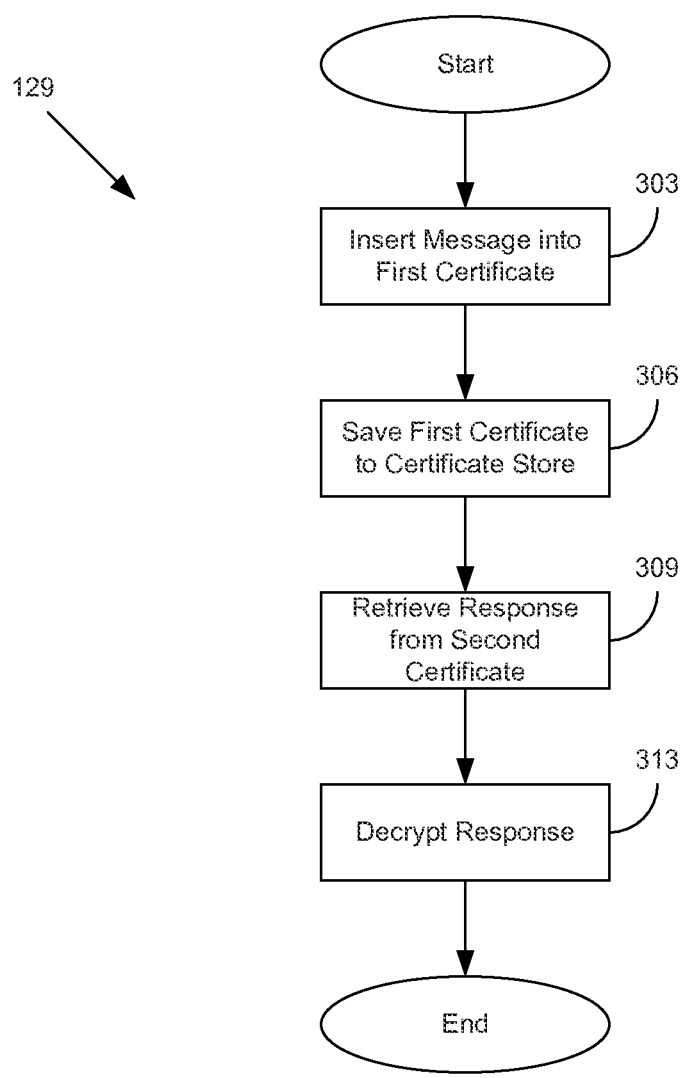
FIG. 3 is a flowchart depicting the operation of an application.

Referring next to FIG. 3, shown is a flowchart that provides one example of the operation of a portion of a client application 129 executing in a sandbox communicating with another client application 129 executing in another sandbox. As an alternative, the flowchart of FIG. 3 can be viewed as depicting an example of elements of a method implemented in the networked environment of FIG. 1.

Beginning with step 303, the client application 129 inserts a message into a first certificate 119. In some instances, the client application 129 can locally generate a first certificate 119 that contains the message. In other instances, the client application 129 can send a request to a certificate service 116 for a certificate 119 containing the message. In these instances, the client application 129 can provide the message to be inserted into the first certificate 119 into the request.

In some instances, the client application 129 can encrypt the message prior to insertion of the message into the first certificate 119. For example, the client application 129 can encrypt the message using a symmetric encryption key shared with another client application 129. In another example, the client application 129 can encrypt the message using a public-key corresponding to a private key of the other client application 129.

Proceeding to step 306, the client application 129 saves the first certificate 119 to a certificate store accessible to the other client application 129. If the other client application 129 is being executed by the same user, the client application 129 can save the first certificate 119 to the user certificate store 136. If the other client application 129 is being executed by a different user of the client device 106, then the client application 129 can save the first certificate 119 to the machine certificate store 133. Similarly, if the user executing the other client application 129 is unknown, then the certificate 119 can be saved to the machine certificate store 133.

Moving on to step 309, the client application 129 retrieves a response to the message from a second certificate 119 saved by the other client application 129. For example, the client application 129 can repeatedly poll the machine certificate store 133 or the user certificate store 136 for a second certificate 119. The client application 129 can then parse the second certificate 119 to identify a response to the message.

In some instances, the second certificate 119 can correspond to a modified version of the first certificate 119. In these instances, the client application 129 can poll or otherwise monitor the first certificate 119 for changes. Once the client application 129 has determined that the first certificate 119 has changed, resulting in a corresponding second certificate 119. The client application 129 can then parse the second certificate 119 to identify a response to the message.

Referring next to step 313, the client application 129 decrypts the response to the message. For example, the client application 129 can decrypt the response using the symmetric encryption key shared with the other client application 129. As another example, response can be encrypted using a public-key that corresponds to a private key available to the client application 129. In this example, the client application 129 can use the private key to decrypt the response to the message. Once the message has been retrieved and decrypted, the process subsequently ends.

Figure 4:
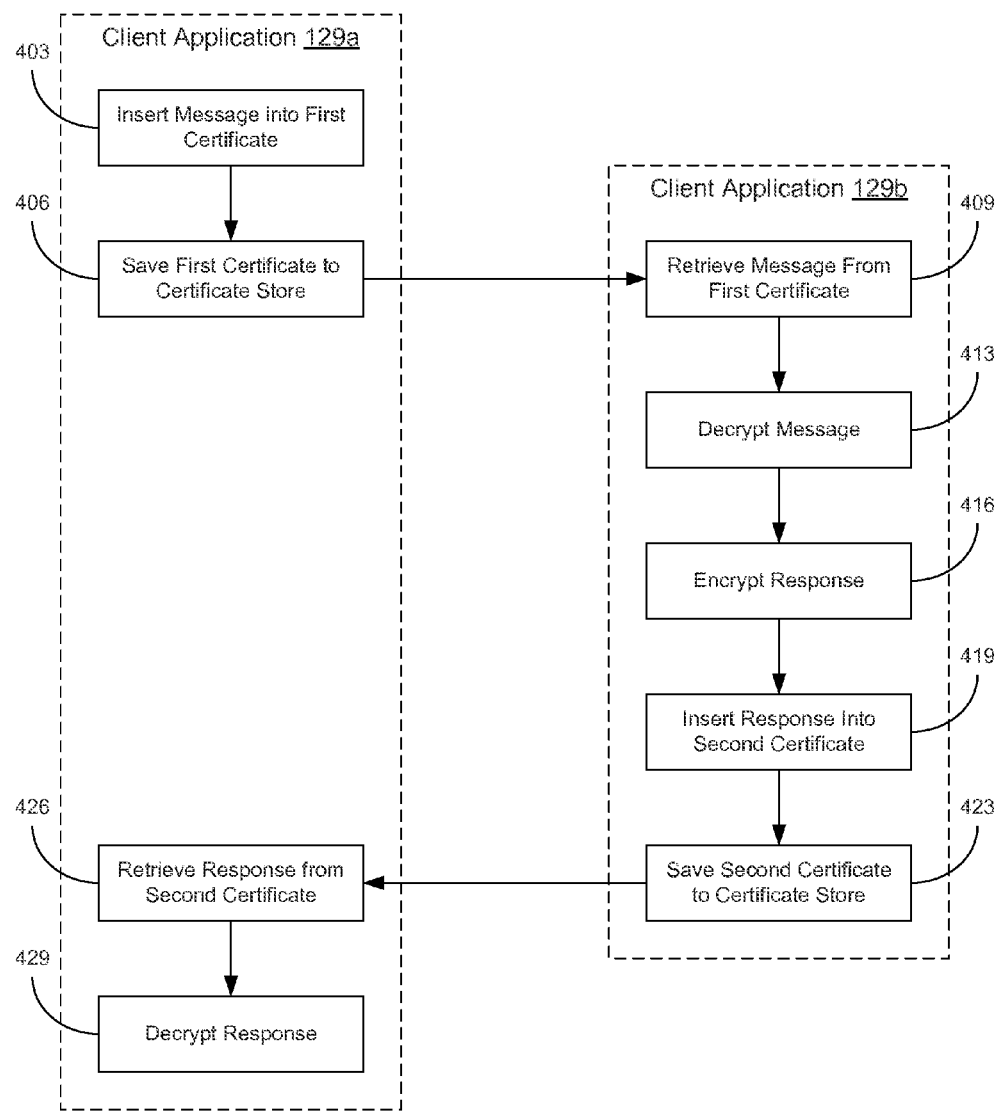
FIG. 4 is a sequence diagram depicting the interaction of various components.

Referring next to FIG. 4, shown is a sequence diagram that provides one example of the operation of a first client application 129a and a second client application 129b communicating using the process described in FIG. 3. As an alternative, the sequence diagram of FIG. 4 can be viewed as depicting an example of elements of a method implemented in the networked environment of FIG. 1.

Beginning with step 403, the client application 129a inserts a message into a first certificate 119. In some instances, the client application 129a can locally generate a first certificate 119 that contains the message. In other instances, the client application 129a can send a request to a certificate service 116 for a certificate 119 containing the message. In these instances, the client application 129a can provide the message to be inserted into the first certificate 119 into the request.

In some instances, the client application 129a can encrypt the message prior to insertion of the message into the first certificate 119. For example, the client application 129a can encrypt the message using a symmetric encryption key shared with another client application 129a. In another example, the client application 129a can encrypt the message using a public-key corresponding to a private key of the other client application 129a.

Moving on to step 406, the client application 129a saves the first certificate 119 to a certificate store accessible to the client application 129b. If the other client application 129b is being executed by the same user, the client application 129a can save the first certificate 119 to the user certificate store 136. If the other client application 129b is being executed by a different user of the client device 106, then the client application 129a can save the first certificate 119 to the machine certificate store 133. Similarly, if the user executing the other client application 129b is unknown, then the certificate 119 can be saved to the machine certificate store 133.

Proceeding to step 409, the client application 129b retrieves the message from the first certificate 119 saved by the other client application 129a. For example, the client application 129b can repeatedly poll the machine certificate store 133 or the user certificate store 136 for the first certificate 119. The client application 129b can then parse the first certificate 119 to identify the message.

Referring next to step 413, the client application 129b decrypts the message. For example, the client application 129b can decrypt the message using the symmetric encryption key shared with the client application 129a. As another example, the message can be encrypted using a public-key that corresponds to a private key available to the client application 129b. In this example, the client application 129b can use the private key to decrypt the message. Once the message has been retrieved and decrypted, the process subsequently ends.

Moving on to step 416, the client application 129b can encrypt the response prior to insertion of the response into a second certificate 119. For example, the client application 129b can encrypt the response using a symmetric encryption key shared with the other client application 129a. In another example, the client application 129b can encrypt the message using a public-key corresponding to a private key of the other client application 129a.

Proceeding to step 419, the client application 129b inserts a message into the second certificate 119. In some instances, the client application 129b can locally generate the second certificate 119 that contains the response. In other instances, the client application 129b can send a request to a certificate service 116 for a certificate 119 containing the response. In these instances, the client application 129b can provide the message to be inserted into the first certificate 119 into the request.

Referring next to step 423, the client application 129b saves the second certificate 119 to a certificate store accessible to the client application 129a. If the other client application 129a is being executed by the same user, the client application 129b can save the second certificate 119 to the user certificate store 136. If the other client application 129a is being executed by a different user of the client device 106, then the client application 129b can save the second certificate 119 to the machine certificate store 133. Similarly, if the user executing the other client application 129a is unknown, then the certificate 119 can be saved to the machine certificate store 133.

Moving on to step 426, the client application 129a retrieves a response to the message from a second certificate 119 saved by the other client application 129b, as previously described above for step 309. Referring next to step 429, the client application 129a decrypts the response to the message, as previously described above for step 313. Once the message has been retrieved and decrypted, the process subsequently ends.

The sequence diagrams of FIG. 2 and FIG. 4 and the flowchart of FIG. 3 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagram of FIG. 2 and FIG. 4 and the flowchart of FIG. 3 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages can be added to the logical flow described herein, for purposes of enhanced utility, accounting, performance measurement, or troubleshooting aid. It is understood that all of these variations are within the scope of the present disclosure.

The computing environment 103, the client device 106, and other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The computing environment 103, the client device 106, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (for example, field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system, comprising:
   a client device comprising a first application executing in a first sandbox and a second application executing in a second sandbox;
   a computing device in data communication with the client device, the computing device comprising a processor and a memory; and
   machine-readable instructions stored in the memory that, when executed by the processor, cause the computing device to at least:
   receive a request for a certificate from the first application executing in the first sandbox on the client device, the request containing a message generated by the first application to be delivered to the second application executing in the second sandbox on the client device;
   generate the certificate;
   insert the message into the certificate;
   send a response to the client device, wherein the response includes the certificate; and
   instruct the client device to store the certificate in a user certificate store or a machine certificate store;
   wherein the second client application is configured to cause the client device to parse the certificate to identify the message inserted into the certificate.

2. The system of claim 1, wherein the machine-readable instructions further cause the computing device to at least send a message to the client device, wherein the message directs the client device to send the request to the computing device.

3. The system of claim 1, wherein the machine-readable instructions further cause the computing device to at least encrypt the message inserted into the certificate.

4. The system of claim 3, wherein the machine readable instructions that cause the computing device to at least encrypt the message inserted into the certificate further comprise machine readable instructions that cause the computing device to encrypt the message using a symmetric encryption key shared by the first application and the second application.

5. The system of claim 1, wherein the request and the response comply with a version of the simple certificate enrollment protocol (SCEP).

6. The system of claim 1, wherein the certificate is an X.509 certificate and the message is inserted into a public key field of the X.509 certificate.

7. The system of claim 1, wherein the message from the first application to the second application comprises an application programming interface (API) call.

8. A method, comprising:
   sending, from a first application executing in a first sandbox on a first computing device, a request for a certificate, the request comprising a message generated by the first application to be delivered to a second application executing in a second sandbox on the first computing device;
   receiving, with a second computing device, the request for the certificate from the first application executing on the first computing device;
   generating, with the second computing device, the certificate;
   inserting, with the second computing device, the message into the certificate;
   sending, with the second computing device, a response to the client device, wherein the response includes the certificate;
   instructing, with the second computing device, the first computing device to store the certificate in a user certificate store or a machine certificate store; and
   parsing, with the second application executing on the first computing device, the certificate to identify the message inserted into the certificate.

9. The method of claim 8, wherein the message comprises a first message and the method further comprises sending a second message from the second computing device to the first computing device, wherein the second message directs the client device to send the request to the second computing device.

10. The method of claim 8, further comprising, with the second computing device, encrypting the message inserted into the certificate.

11. The method of claim 10, wherein encrypting the message inserted into the certificate further comprises encrypting the message using a symmetric encryption key shared by the first application and the second application.

12. The method of claim 8, wherein the request and the response comply with a version of the simple certificate enrollment protocol (SCEP).

13. The method of claim 8, wherein the certificate is an X.509 certificate and the message is inserted into a public key field of the X.509 certificate.

14. The method of claim 8, wherein the message from the first application to the second application comprises a list of applications currently installed on the first computing device.

15. A plurality of non-transitory computer readable mediums, comprising: a non-transitory computer readable medium comprising a first set of machine readable instructions that, when executed by a first processor of a computing device, cause the computing device to at least:
- establish data communication with a first application executing in a first sandbox on a client device and a second application executing in a second sandbox on the client device;
- receive a request for a certificate from the first application executing in the first sandbox on the client device, the request containing a message generated by the first application to be delivered to second application executing in the second sandbox on the client device;
- generate the certificate;
- insert the message into the certificate;
- send a response to the client device, wherein the response includes the certificate; and
- instruct the client device to store the certificate in a user certificate store or a machine certificate store; and
- a second non-transitory computer readable medium comprising a second set of machine readable instructions embodying the second application executing on the client device that, when executed by a second processor of the client device, cause the client device to parse the certificate to identify the message inserted into the certificate.

16. The plurality of non-transitory computer readable mediums of claim 15, wherein the message comprises a first message and the machine readable instructions further cause the computing device to at least send a second message to the client device, wherein the second message directs the client device to send the request to the application.

17. The plurality of non-transitory computer readable mediums of claim 15, wherein the machine readable instructions further cause the computing device to at least encrypt the message inserted into the certificate.

18. The plurality of non-transitory computer readable mediums of claim 15, wherein the request and the response comply with a version of the simple certificate enrollment protocol (SCEP).

19. The plurality of non-transitory computer readable mediums of claim 15, wherein the certificate is an X.509 certificate and the message is inserted into a public key field of the X.509 certificate.

20. The plurality of non-transitory computer readable mediums of claim 15, wherein the message from the first application to the second application comprises an event notification from the first application to the second application.

* * * * *